United States Patent
Chen et al.

(10) Patent No.: US 11,765,384 B2
(45) Date of Patent: *Sep. 19, 2023

(54) METHOD AND APPARATUS OF MOTION COMPENSATION BASED ON BI-DIRECTIONAL OPTICAL FLOW TECHNIQUES FOR VIDEO CODING

(71) Applicant: HFI INNOVATION INC., Zhubei (TW)

(72) Inventors: Ching-Yeh Chen, Taipei (TW); Tzu-Der Chuang, Zhubei (CN); Yu-Wen Huang, Taipei (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/391,983

(22) Filed: Aug. 2, 2021

(65) Prior Publication Data

US 2021/0368204 A1 Nov. 25, 2021

Related U.S. Application Data

(62) Division of application No. 16/073,996, filed as application No. PCT/CN2017/072826 on Feb. 3, 2017, now Pat. No. 11,109,061.

(Continued)

(51) Int. Cl.
*H04N 19/577* (2014.01)
*H04N 19/159* (2014.01)
(Continued)

(52) U.S. Cl.
CPC ......... *H04N 19/577* (2014.11); *H04N 19/105* (2014.11); *H04N 19/159* (2014.11);
(Continued)

(58) Field of Classification Search
CPC .......................... H04N 19/577; H04N 19/105
See application file for complete search history.

(56) References Cited

U.S. PATENT DOCUMENTS

| 2015/0256850 A1* | 9/2015 | Kottke | H04N 19/513 |
| | | | 375/240.16 |
| 2016/0088303 A1* | 3/2016 | Lee | H04N 19/186 |
| | | | 375/240.12 |

(Continued)

FOREIGN PATENT DOCUMENTS

| CN | 101330509 A | 12/2008 |
| CN | 102934444 A | 2/2013 |

OTHER PUBLICATIONS

Algorithm Description of Joint Exploration Test Model 1; International Organization for Standardization; Oct. 015; pp. 1-27.

(Continued)

*Primary Examiner* — Jerry T Jean Baptiste
(74) *Attorney, Agent, or Firm* — Oblon, McClelland, Maier & Neustadt, L.L.P.

(57) ABSTRACT

Methods and apparatus of motion compensation using the bi-directional optical flow (BIO) techniques are disclosed. According to one method of the present invention, the BIO process is applied to encode or decode bi-directional current block in Merge mode only or in AMVP (advanced motion vector prediction) mode only. According to another method, the BIO process conditionally to encode or decode the current block depending on a jointly-coded flag if the current block is coded using a bi-prediction mode. According to yet another method, x-offset value $v_x$ and y-offset value $v_y$ for the current block are added to the current motion vector to form a final motion vector. The final motion vector is then used as a reference motion vector for following blocks. In still yet another method, the BIO process is applied to the chroma component.

6 Claims, 5 Drawing Sheets

Related U.S. Application Data

(60) Provisional application No. 62/291,588, filed on Feb. 5, 2016.

(51) Int. Cl.

| | | |
|---|---|---|
| *H04N 19/513* | (2014.01) | |
| *H04N 19/182* | (2014.01) | |
| *H04N 19/46* | (2014.01) | |
| *H04N 19/537* | (2014.01) | |
| *H04N 19/105* | (2014.01) | |
| *H04N 19/52* | (2014.01) | |
| *H04N 19/186* | (2014.01) | |

(52) U.S. Cl.
CPC .......... *H04N 19/182* (2014.11); *H04N 19/46* (2014.11); *H04N 19/513* (2014.11); *H04N 19/537* (2014.11); *H04N 19/186* (2014.11); *H04N 19/52* (2014.11)

(56) References Cited

U.S. PATENT DOCUMENTS

| | | | | |
|---|---|---|---|---|
| 2016/0100189 A1* | 4/2016 | Pang | .................... | H04N 19/593 |
| | | | | 375/240.13 |
| 2017/0006289 A1* | 1/2017 | Alshina | .................. | H04N 19/14 |
| 2017/0094305 A1* | 3/2017 | Li | ........................ | H04N 19/136 |

OTHER PUBLICATIONS

McCann, K., et al.; "Description of high efficiency scalable video coding technology proposal by Samsung and Vidyo;" Joint Collaborative Team on Video Coding (JCT-VG) of ITU-T SG16 WP3 and 1SO/IEC JTC1/SC29/WG11; October eo12; pp. 1-31.

Alshin, A., et al.; "Bi-directional optical flow for improving motion compensation;" 28th Picture Coding Symposium; Dec. 201 O; pp. 422-425.

Alshina, E., et al.; "Known tools performance investigation for next generation video coding;" ITU-telecommunications Standardization Sector; Jun. 2015; pp. 1-7.

International Search Report dated May 9, 2017, issued in application No. PCT/CN2017/072826.

Alshina, E., et al.; "Bi-directional optional flow;" Joint Collaborative Team on Video Coding (JCT-VC) of ITU-T SG16 I/VP3 and 1SO/IEC JTC1/SC29/WG11; Oct. 2010; pp. 1-5.

A. Alshin, E. Alshina, T. Lee, Samsung Electronics Co., Ltd. "Bi-Directional Optical Flow for Improving Motion Compensation", 28th Picture Coding Symposium, PCS2010, Dec. 8-10, 2010, Nagoya, Japan (4 pages).

Elena Alshina, Samsung Electronics Co., Ltd., "Bi-directional optical flow", Document: JCTVC-C204, Oct. 2010 (6 pages).

E. Alshina, et al., Samsung Electronics, "Known tools performance investigation for next generation video coding", Document VCEG-AZ05, Jun. 2015 (7 pages).

European Search Report issued in corresponding Application No. 22193886.3 dated Jan. 20, 2023 (10 pages).

International Organization for Standardization Organisation Internationale De Normalisation ISO/IEC JTC1/SC29/WG 11 Coding of Moving Pictures and Audio. "Algorithm Description of Joint Exploration Test Model 1 (JEM 1)" Oct. 2015 (27 pages).

Huang Jin-Jie, Jiang Yong-Fu, et al., Department of Automation, Harbin University of Science and Technology, Harbin China "An Improved Approach to Calculation of the Optical Flow Field for Color Image Sequences" 2010 IEEE, (6 pages).

Ken McCann, Samsung Electronics Co., Ltd. And Vidyo, Inc., "Description of high efficiency scalable video coding technology proposal by Samsung and Vidyo", Document: JCTVC-K0044, Oct. 2012 (31 pages).

\* cited by examiner

METHOD AND APPARATUS OF MOTION COMPENSATION BASED ON BI-DIRECTIONAL OPTICAL FLOW TECHNIQUES FOR VIDEO CODING

CROSS REFERENCE TO RELATED APPLICATIONS

The present invention is a divisional of U.S. patent application Ser. No. 16/073,996 filed Jul. 30, 2018. U.S. patent application Ser. No. 16/073,996 is a 371 of international application No: PCT/CN/2017/072826 filed Feb. 3, 2017 which claims priority to U.S. Provisional Patent Application, Ser. No. 62/291,588, filed on Feb. 5, 2016, the entire contents of each are incorporated herein by reference.

TECHNICAL FIELD

The present invention relates to motion compensation for video coding using bi-directional optical flow (BIO) techniques. In particular, the present invention relates to using the BIO selectively for certain conditions to improve performance or reduce complexity for using the BIO techniques.

BACKGROUND

Bi-directional optical flow (BIO) is motion estimation/compensation technique disclosed in JCTVC-C204 (E. Alshina, et al., Bi-directional optical flow, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZO5 (E. Alshina, et al., Known tools performance investigation for next generation video coding, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion. It is applied only for truly bi-directional predicted blocks, which is predicted from two reference frames corresponding to the previous frame and the latter frame. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computation complexity of BIO is much higher than that of traditional bi-directional prediction. In order to further improve the performance of BIO, the following methods are proposed.

In a conventional bi-prediction in the emerging HEVC (High Efficiency Video Coding) standard, the predictor is generated using equation (1), where $P^{(0)}$ and $P^{(1)}$ are the list0 and list1 predictors, respectively.

$$P_{Conventional}[i,j] = (P^{(0)}[i,j] + P^{(1)}[i,j] + 1) >> 1 \tag{1}$$

In JCTVC-C204 and VECG-AZ05, the BIO predictor is generated using equation (2).

$$P_{OpticalFlow} = (P^{(0)}[i,j] + P^{(1)}[i,j] + \tag{2}$$

$$v_x[i,j](I_x^{(0)} - I_x^{(1)}[i,j]) + v_y[i,j](I_y^{(0)} - I_y^{(1)}[i,j]) + 1) >> 1$$

In equation (2), $I_x^{(0)}$ and $I_x^{(1)}$ represent the x-directional gradient in list0 and list1 predictors, respectively; $I_y^{(0)}$ and $I_y^{(1)}$ represent the y-directional gradient in list0 and list1 predictors, respectively; $v_x$ and $v_y$ represent the offsets in x- and y-direction, respectively. FIG. 1 illustrates an example of motion compensation using bi-directional optical flow technique, where reference picture 0 (130) and reference picture 1 (110) are used to derive motion vectors for B-slice (120). The offsets Vx and Vy are derived and used in eq. (2). The above equations are derived using differential techniques to compute velocity from spatiotemporal derivatives of image intensity as shown in eq. (3a) and eq. (3b), where I(x, y, t) represents image intensity in the spatiotemporal coordinates:

$$I(x,y,t) = I(x+MV0_x+v_x, y+MV0_y+v_y, t-\Delta t) \tag{3a}$$

$$= I(x+MV1_x-v_x, y+MV1_y-v_y, t+\Delta t) \tag{3b}$$

Eq. (3a) can be further derived as follows:

$$I(x+MV0_x+v_x, y+MV0_y+v_y, t-\Delta t) = \tag{4a}$$

$$P^0(x,y) + v_x \frac{\partial P^0(x,y)}{\partial x} + v_y \frac{\partial P^0(x,y)}{\partial y}$$

Similarly, eq. (3b) can be further derived as follows:

$$I(x+MV1_x-v_x, y-MV1_y-v_y, t+\Delta t) = \tag{4b}$$

$$P^1(x,y) - v_x \frac{\partial P^1(x,y)}{\partial x} - v_y \frac{\partial P^1(x,y)}{\partial y}$$

Accordingly, the bi-directional optical flow is derived as follows, which is equivalent to eq. (2) with $I_x^{(0)} = \partial P^0(x,y)/\partial x$, $I_x^{(1)} = \partial P^1(x,y)/\partial x$, $I_y^{(0)} = \partial P^0(x,y)/\partial y$ and $I_y^{(1)} = \partial P^1(x,y)/\partial y$:

$$P_{OpticalFlow}\left(P^0(x,y) + P^1(x,y) + \right. \tag{5}$$

$$\left. v_x\left(\frac{\partial P^0(x,y)}{\partial x} - \frac{\partial P^1(x,y)}{\partial x}\right) + v_y\left(\frac{\partial P^0(x,y)}{\partial y} - \frac{\partial P^1(x,y)}{\partial y}\right) + 1\right) >> 1$$

The difference $\Delta[i, j]$ between values in two points can be derived according to:

$$\Delta[i,j] = P^{(0)}[i,j] - P^{(1)}[i,j] + v_x[i,j](I_x^{(0)}[i,j] + I_x^{(1)}[i,j]) + \tag{6}$$

$$v_y[i,j](I_y^{(0)}[i,j] + I_y^{(1)}[i,j])$$

$$= P^{(0)}[i,j] + v_x[i,j]I_x^{(0)}[i,j] + v_y[i,j]I_y^{(0)}[i,j] -$$

$$(P^{(1)}[i,j] - v_x[i,j]I_x^{(1)}[i,j] - v_y[i,j]I_y^{(1)}[i,j]$$

The difference $\Delta[i, j]$ between values in two points is referred as flow difference at two points in this disclosure. In eq. (6), $v_x[i,j]$ and $v_y[i,j]$ are pixel-wise motion vector refinement components, where only fine motion is considered and the major motion is compensated by MC. Also $(I_x^{(0)}[i,j], I_y^{(0)}[i,j])$ and $(I_x^{(1)}[i,j], I_y^{(1)}[i,j])$ are gradients of luminance I in the position [i j] of list0 and list1 reference frames correspondently. The motion vector refinement components, $v_x[i,j]$ and $v_y[i,j]$ are also referred as the x-offset value and the y-offset value in this disclosure.

In order to solve $v_x[i,j]$ and $v_y[i,j]$, a window consisting the pixel being processed and (2M+1)×(2M+1) neighbours is used. The pixel set Ω represents pixels in the window, i.e., [i', j']∈Ω if and only if i−M≤i'≤i+M and j−M≤j'≤j+M. The $v_x[i,j]$ and $v_y[i,j]$ are selected based on the values that minimizes:

$$\sum_{[i',j]\subset\Omega} \Delta^2[i', j].$$

The gradient calculation for integer pixel resolution is shown as follows:

$$I_x^{(k)}[i, j] = (P^{(k)}[i+1, j] - P^{(k)}[i, j])/2, \quad (7a)$$

$$I_y^{(k)}[i, j] = (P^{(k)}[i, j+1] - P^{(k)}[i, j])/2. \quad (7b)$$

For fractional pixel resolution, interpolation will be performed first and the gradient is calculated as follows:

$$P^{(k)}[i] = \sum_{n=-M+1}^{M} F_n(\alpha_x^{(k)})R^{(k)}[i+n],$$

$$I_x^{(k)}[i] = \sum_{n=-M+1}^{M} dF_n(\alpha_x^{(k)})R^{(k)}[i+n], k = 0, 1,$$

$$dF_n(\alpha_x^{(k)}) = (F_n(\alpha_x^{(k)} + h) - F_n(\alpha_x^{(k)} - h))/2h$$

$$I_y^{(k)}[i, j] = \sum_{n=-M+1}^{M} dF_n(\alpha_y^{(k)})R^{(k)}[i, j+n], k = 0, 1,$$

In the above equations, a is block motion vector, $R^{(k)}[i,j]$ is reference picture value in integer position [i,j] for references k=0 or 1, $F_n(\alpha)$ is filter coefficient of interpolation filter for fractional MC.

For x-directional gradient, if the y-location is an integer, the luma gradient filter is applied. If the y-location is fractional, interpolation in they direction is performed and then luma gradient filter is applied in the x-direction. For y-directional gradient, if the x-location is an integer, the luma gradient filter is applied. If the x-location is fractional, luma gradient filter is applied in the y-direction and then interpolation in the x-direction is performed.

In the existing BIO implementation, the window size for $v_x[i,j]$ and $v_y[i,j]$ are 5×5 and BIO is only applied to the luma component with truly bi-predicted 2N×2N coding units (CUs) only. For gradient calculation at fractional pixel resolution, an additional 6-tap interpolation/gradient filter is used, and the vertical process is performed first followed by the horizontal process.

SUMMARY

A method and apparatus of motion compensation using the bi-directional optical flow (BIO) techniques are disclosed. According to one method of the present invention, the BIO (bi-directional optical flow) process is applied conditionally to encode or decode the current block depending on a current mode used to encode or decode the current block if the current block is coded by using a bi-prediction mode. The current mode with the BIO process is used to encode or decode the current block if the current mode is equal to one or more selected modes, and the current mode without the BIO process is used to encode or decode the current block if the current mode is not equal to said one or more selected modes. In one embodiment, the selected modes only consist of Merge mode. In another embodiment, the selected modes only consist of AMVP (advanced motion vector prediction) mode.

According to another method, the BIO process is conditionally applied to encode or decode the current block depending on a jointly-coded flag if the current block is coded using a bi-prediction mode. The current mode with the BIO process is used to encode or decode the current mode if the jointly-coded flag has a first value, and the current mode without the BIO process is used to encode or decode the current mode if the jointly-coded flag has a second value. When the current block is not coded in the bi-prediction mode, the jointly-coded flag can be used to indicate whether another process is on or off for the current block. Said another process may correspond to a low-pass filter process, sharpening filter process, or an offset process to modify motion compensated results.

According to yet another method, the BIO process is applied to derive x-offset value $v_x$ and y-offset value $v_y$ for a current block. The x-offset value $v_x$ and y-offset value $v_y$ for the current block are added to one or more original motion vectors to obtain one or more final motion vectors for the current block. The bi-directional predictors are generated based on the final motion vectors for the current block, and a bi-directional mode using the bi-directional predictors is used to encode or decode the current block. The final motion vectors for the current block are stored to be referenced by one or more following blocks. The x-offset value $v_x$ and the y-offset value $v_y$ can be clipped to a pre-defined range before the final motion vectors are stored. The pre-defined range may correspond to [−16, 16]. The x-offset value $v_x$ and the y-offset value $v_y$ can be clipped within one integer pixel.

In still yet another embodiment, the BIO process is applied to encode or decode a current chroma block if the current chroma block is coded using a bi-prediction mode. The chroma x-offset value $v_x$ and chroma y-offset value $v_y$ associated with the BIO process for the current chroma block can be derived only based on one or more chroma components. The chroma x-offset value $v_x$ and chroma y-offset value $v_y$ associated with the BIO process for the current chroma block may also reuse luma x-offset value $v_x$ and luma y-offset value $v_y$ associated with the BIO process that are derived based on the luma component only. In this case, the chroma x-offset value $v_x$ and the chroma y-offset value $v_y$ are scaled based on a resolution ratio of the luma component and said one or more chroma components. The x-offset value $v_x$ and y-offset value $v_y$ associated with the BIO process for the current chroma block can also be derived based on the luma component and one or more chroma components.

DETAILED DESCRIPTION

Figure 1:
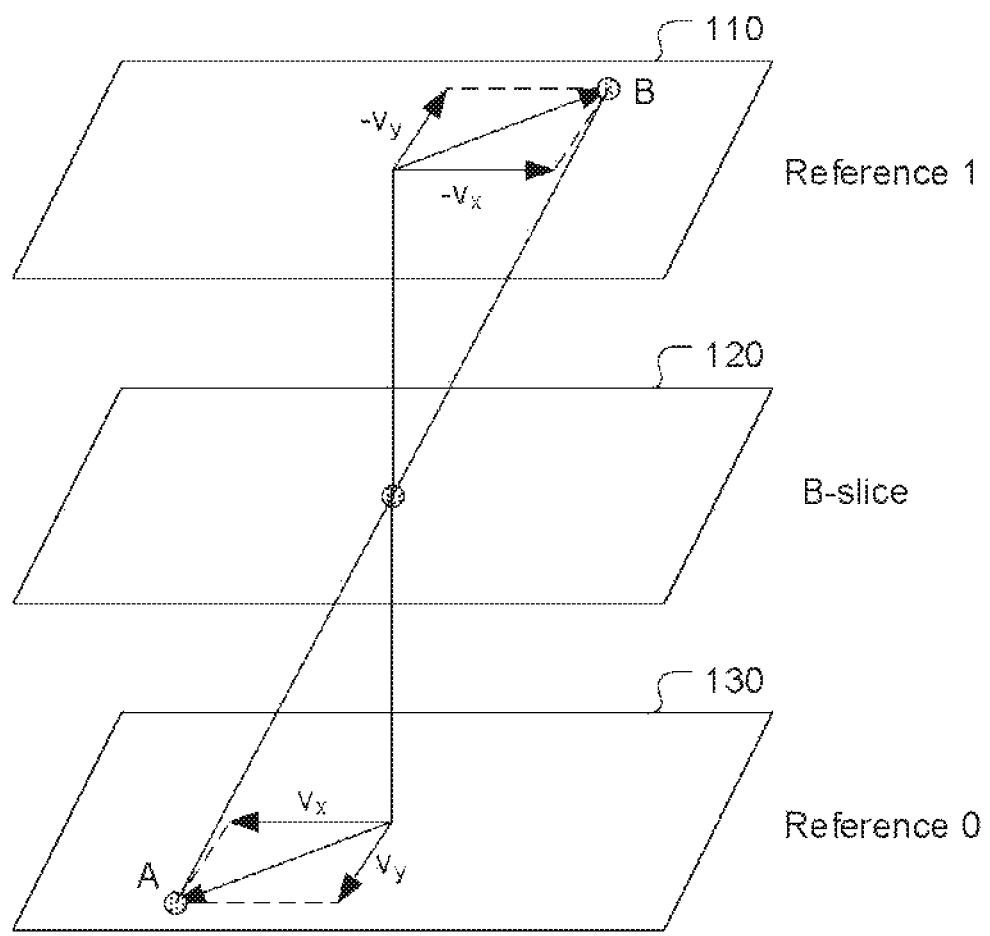
FIG. 1 illustrates an example of motion compensation using bi-directional optical flow technique.

The following description is of the best-contemplated mode of carrying out the invention. This description is made for the purpose of illustrating the general principles of the invention and should not be taken in a limiting sense. The scope of the invention is best determined by reference to the appended claims.

In VCEG-AZ05, the Bi-directional Optical flow (BIO) is implemented as an additional process to the process as specified in the HEVC reference software. The motion compensated prediction according to the conventional HEVC is generated as shown in eq. (1). On the other hand, the motion compensated prediction according to BIO is shown in eq. (2), where additional parameters are determined to modify the conventional motion compensated prediction. The BIO is always applied to those blocks that are predicted with true bi-directions.

Various methods are disclosed to reduce the complexity or cost associated with the BIO process. Each method is disclosed as follows.

BIO for Merge or AMVP Mode Only

In VECG-AZ05, the BIO process is always applied for all truly bi-predicted CUs. As mentioned before, a truly bi-directional predicted block is predicted from two reference frames corresponding to the previous frame and the latter frame. However, not all truly bi-predicted CUs can be improved by the BIO process. Therefore, a method according to the present invention discloses that conditionally applies BIO for truly bi-predicted CUs. For example, the BIO process is only applied for truly bi-predicted CUs coded by Merge mode. In another example, the BIO process is only applied for truly bi-predicted CUs coded by AMVP mode. If BIO process is enabled for Merge mode and disabled for AMVP mode, then Merge mode can be used when BIO process is desired for the current CU., When BIO process cannot achieve some coding gain for current CU, then we can use AMVP mode to encode current CU. By using this way, we can disable or enable BIO for one Inter CU with the same motion information by using different syntax.

As is known in advanced video coding standards such as HEVC, for blocks coded in Merge mode, the motion information is inherited from the motion information of one or more neighbouring blocks. When the BIO processing is applied to a block coded in the Merge mode, the motion information of two reference blocks in inherited from neighbouring blocks. The predictor based on Merge mode is combined with the BIO predictor to form a combined predictor. For blocks coded in the AMVP mode, the motion vector differences (MVDs) between the current motion vector and the MV predictors (MVPs) are coded. After the MVs are decoded using the MVDs and the MVPs, the predictor according to the AMVP mode can be generated. When the BIO process is applied to a block coded in the AMVP mode, the predictor for the AMVP mode is combined with the BIO predictor to form the combined predictor.

In a typical video encoder, a rate-distortion optimization process is often used to select a best coding mode among a set of allowed coding modes. When BIO is enabled for both Merge mode and AMVP mode, cost function associated with each coding mode will be evaluated. The involved computations for BIO-enabled Merge mode and BIO-enabled AMVP mode will be rather complicated. According to this method, BIO process is allowed for Merge mode only or for AMVP mode only. Therefore, the complexity for BIO-enabled Inter modes is reduced substantially. Moreover, not all truly bi-predicted CUs can be improved by the BIO process. By using this way, we can enable BIO process for those CUs which can be improved by BIO process only. Therefore, the coding performance associated for BIO enabled for Merge mode only or BIO enabled for AMVP mode only is very close to the system with BIO enabled for both Merge mode and AMVP mode. In other words, while the system with BIO enabled only for Merge mode or BIO enabled only for AMVP mode can substantially reduce the complexity, the penalty on the coding performance is very minimal. Therefore, the system with BIO enabled only for Merge mode or BIO enabled only for AMVP mode is more desirable than the conventional system with BIO enabled for both Merge mode and AMVP mode.

BIO on/Off Flag

According to another method of the present invention, instead of implicitly indicating whether the BIO process is enabled conditionally, an on/off flag is explicitly signalled for each Inter-coded CU. However, BIO can only be applied for truly bi-predicted CUs. Therefore the bit associated with the on/off flag for any non-truly bi-predicted CU is redundant. If one on/off flag is always signalled for each CU, redundant bits will occur. If one on/off flag is signalled conditionally, it may cause a parsing issue since it is hard to validate whether the current CU is coded by true bi-prediction in the parsing stage. In order to solve this problem, a jointly-coded flag is disclosed. According to this method, one on/off flag is always coded for each Inter CU. When a current CU is coded by true bi-prediction, this flag is used to indicate whether the BIO process is enabled or disabled for the current CU. If the current CU is not coded by true bi-prediction, then this flag can be used to indicate whether another function is enabled or disabled for the current CU. For example, another function can be one additional process, which is applied to the motion compensated results. One additional process can be one low-pass filter, one sharpening filter, or some offset process to modify the motion compensated results. In another embodiment, multi-meaning syntax for video coding is disclosed. For a block with the first condition, the multi-meaning syntax is signalled. When the second condition is satisfied, the multi-meaning syntax is the on-off flag, the mode, or the parameter for the first function. Otherwise (i.e., the second condition not satisfied), the multi-meaning syntax is the on/off flag, the mode, or the parameter for the second function. For example, for an Inter mode CU, the multi-meaning syntax is the on/off flag for BIO process when the current CU is predicted by true bi-prediction; and the multi-meaning syntax is the on/off flag for the low-pass motion compensation filter when the current CU is not predicted by true bi-prediction.

Limit $v_x$ and $v_y$ when Storing $v_x$ and $v_y$ as MV

In BIO process of VECG-AZ05, the displacements, x-offset value $v_x$ and y-offset value $v_y$, are derived and used to refine motion compensated results only. According to a method of the present invention, x-offset value $v_x$ and y-offset value $v_y$ are added to the original motion vector of the current block. The x-offset value $v_x$ and y-offset value $v_y$ can be retrieved and added to the original MV to form the final motion vector, which is referenced by the following CUs. When storing the final MV, the range of $v_x$ and $v_y$ are further limited within one integer pixel. The restriction of integer $v_x$ and $v_y$ can help to reduce the memory bandwidth. For example, when the motion compensation process is applied to overlapped CUs or PUs, the limited $v_x$ and $v_y$ can reduce the data access for the overlapped areas. In another embodiment, when x-offset value $v_x$ and y-offset value $v_y$ are to be added to the original MV, the range of $v_x$ and $v_y$ is limited within a predefined range (e.g., clipped to a predefined range such as [−16, 16]) to reduce the memory bandwidth of motion compensation.

BIO for Chroma Component

In VECG-AZ05, BIO process is applied for luma component only. In order to improve BIO performance, BIO process is applied for the chroma component according to a method of the present invention. When applying BIO process to the chroma component, the x-offset value $v_x$ and y-offset value $v_y$, can be derived based on the chroma component only. Alternatively, the x-offset value $v_x$ and y-offset value $v_y$ of luma component can be used for the chroma BIO process. When the x-offset value $v_x$ and y-offset value $v_y$ is shared between the luma and chroma components, the displacement can be derived by luma component only or jointly decided by the luma and chroma components. If the x-offset value $v_x$ and y-offset value $v_y$ of luma component is directly reused, the x-offset value $v_x$ and y-offset value $v_y$ can be further shifted or scaled based on the resolution ratio of luma and chroma components, which is similar to the motion vector scaling between the luma and chroma components. For example, for YUV420, the luma displacement will be right shifted by one bit (i.e., divided by 2) and then be used for chroma BIO.

Figure 2:
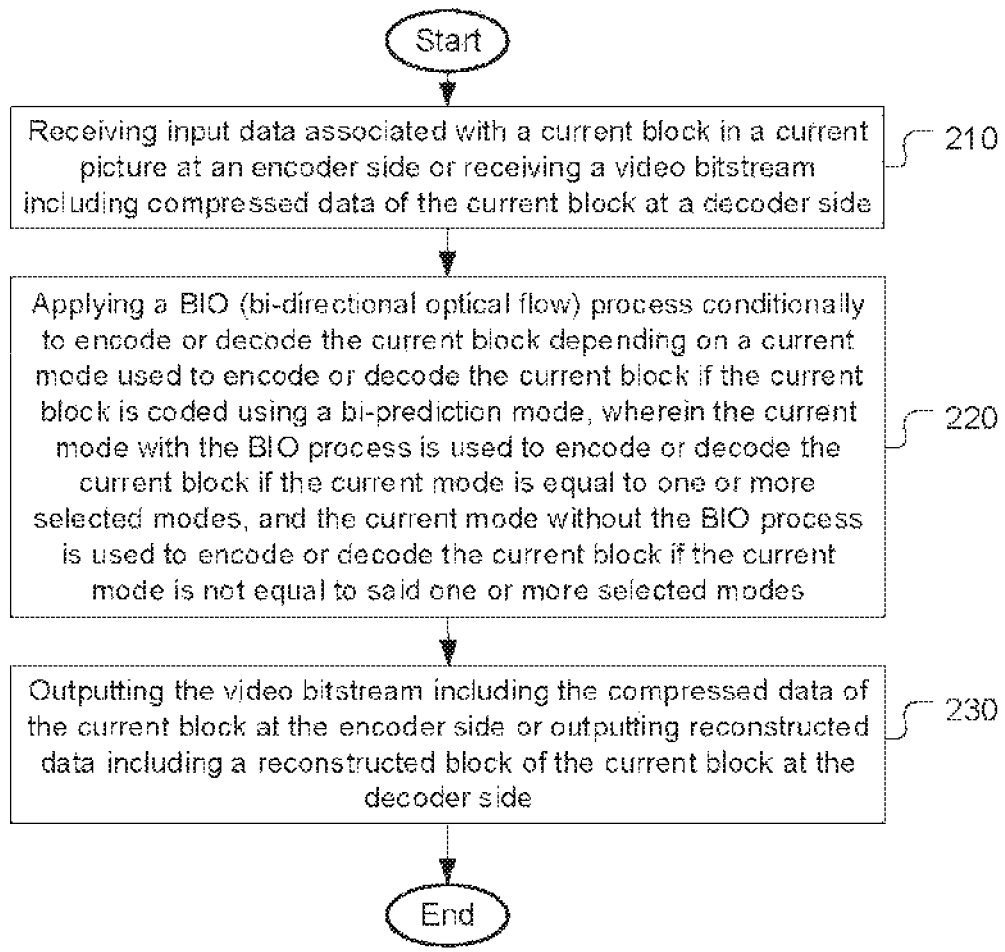
FIG. 2 illustrates an exemplary flowchart of a video coding system incorporating an embodiment of the present invention, where the use of BIO is applied to only a selected coding mode.

FIG. 2 illustrates an exemplary flowchart of a video coding system incorporating an embodiment of the present invention, where the use of BIO process is applied to only a selected coding mode. The steps shown in the flowchart may be implemented as program codes executable on one or more processors (e.g., one or more CPUs) at the encoder side or the decoder side. The steps shown in the flowchart may also be implemented based hardware such as one or more electronic devices or processors arranged to perform the steps in the flowchart. According to this method, input data associated with a current block in a current picture are received at an encoder side or a video bitstream including compressed data of the current block is received at a decoder side as shown in step 210. The BIO (bi-directional optical flow) process is conditionally applied to encode or decode the current block depending on a current mode used to encode or decode the current block if the current block is coded using a bi-prediction mode in step 220. The current mode with the BIO process is used to encode or decode the current block if the current mode is equal to one or more selected modes, and the current mode without the BIO process is used to encode or decode the current block if the current mode is not equal to said one or more selected modes. For example, said one or more selected modes only consist of Merge mode. In another example, said one or more selected modes only consist of AMVP (advanced motion vector prediction) mode. In step 230, the video bitstream including the compressed data of the current block is outputted at the encoder side or reconstructed data including a reconstructed block of the current block at the decoder side.

Figure 3:
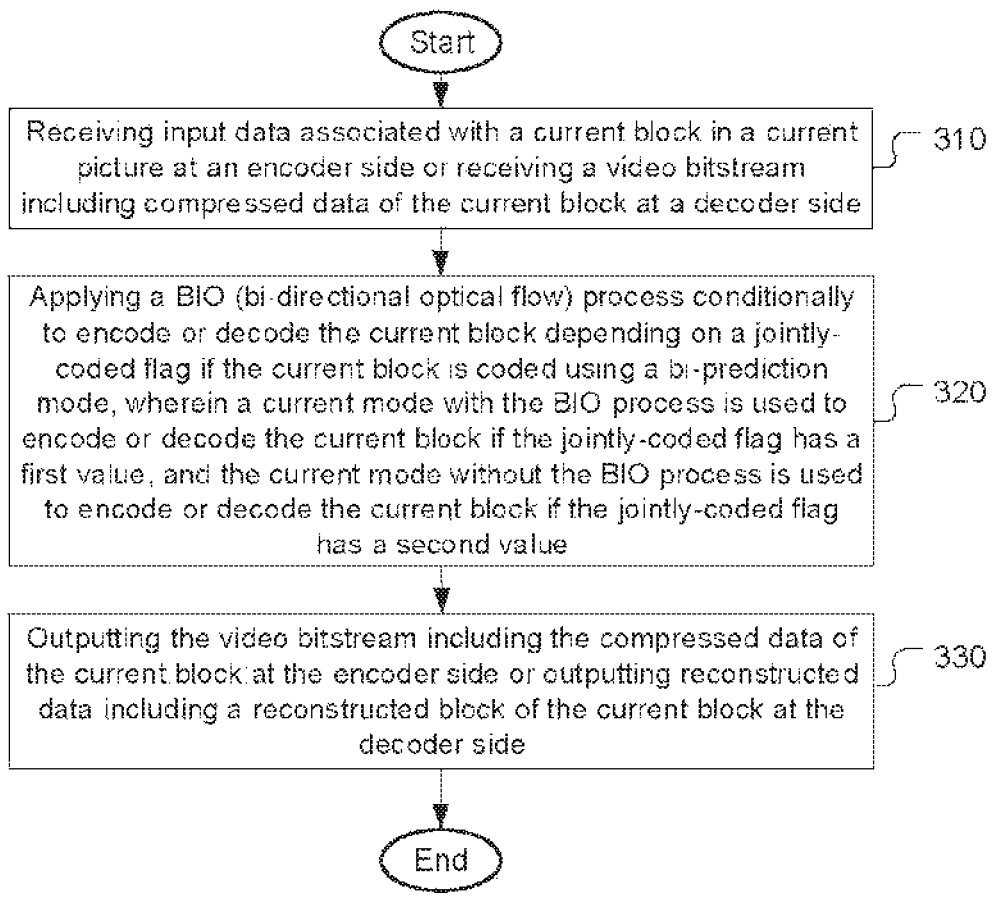
FIG. 3 illustrates an exemplary flowchart of a video coding system incorporating an embodiment of the present invention, where the use of BIO is according to a jointly-coded flag if the current block is coded in a bi-directional prediction mode.

FIG. 3 illustrates an exemplary flowchart of a video coding system incorporating an embodiment of the present invention, where the use of BIO is according to a jointly-coded flag if the current block is coded in a bi-directional prediction mode. Again, the steps shown in the flowchart may be implemented as program codes executable on one or more processors (e.g., one or more CPUs) at the encoder side or the decoder side. The steps shown in the flowchart may also be implemented based hardware such as one or more electronic devices or processors arranged to perform the steps in the flowchart. According to this method, input data associated with a current block in a current picture are received at an encoder side or a video bitstream including compressed data of the current block is received at a decoder side as shown in step 310. The BIO process is conditionally applied to encode or decode the current block depending on a jointly-coded flag if the current block is coded using a bi-prediction mode as shown in step 320. A current mode with the BIO process is used to encode or decode the current block if the jointly-coded flag has a first value, and the current mode without the BIO process is used to encode or decode the current block if the jointly-coded flag has a second value. For example, the first value may correspond to "1" to indicate enabling and "0" to indicate disabling. In step 330, the video bitstream including the compressed data of the current block is outputted at the encoder side or reconstructed data including a reconstructed block of the current block at the decoder side.

Figure 4:
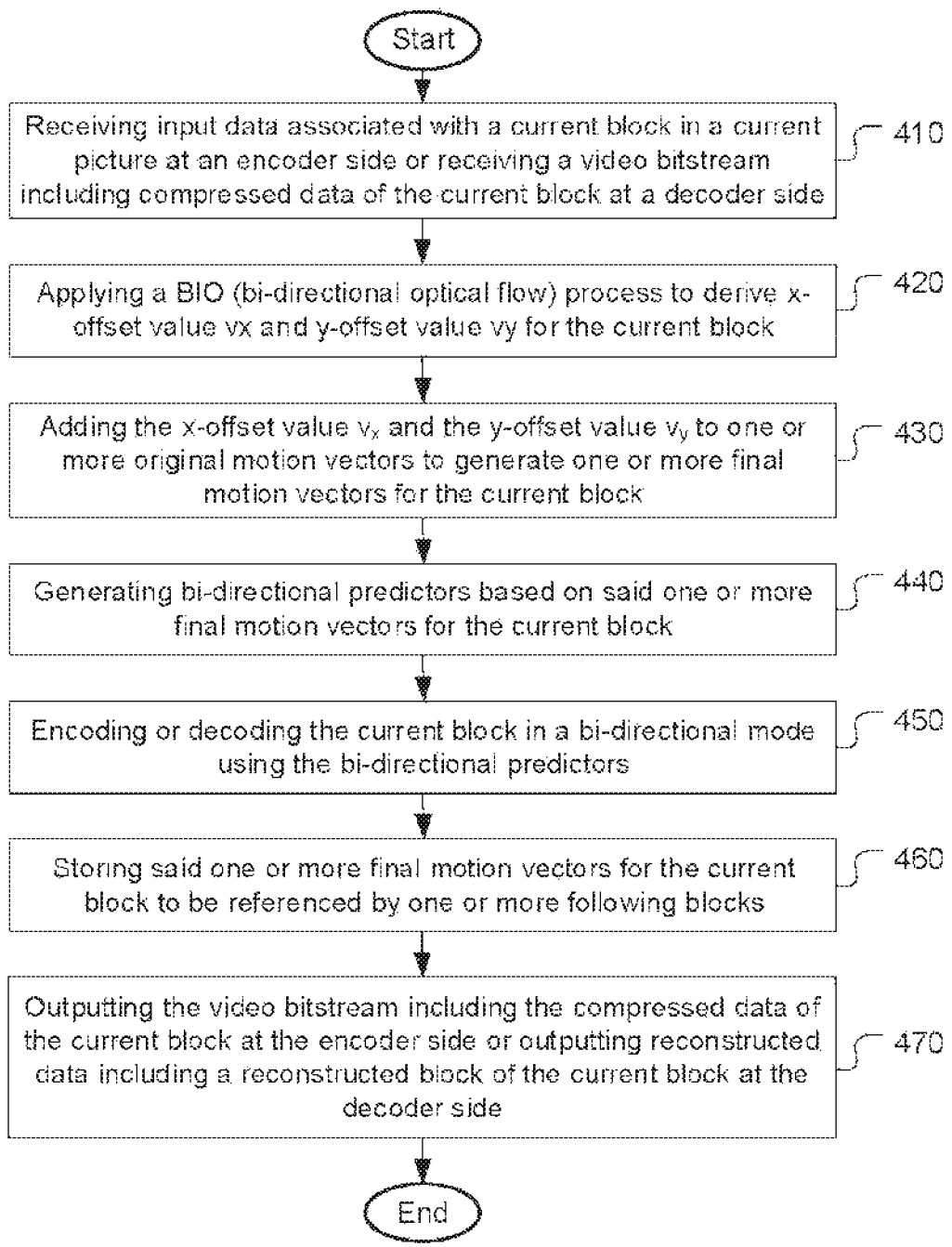
FIG. 4 illustrates an exemplary flowchart of a video coding system incorporating an embodiment of the present invention, where the x-offset value $v_x$ and y-offset value $v_y$ for the current block are refined and added to the current motion vector as a final motion vector, which is referred by a following block.

FIG. 4 illustrates an exemplary flowchart of a video coding system incorporating an embodiment of the present invention, where the x-offset value $v_x$ and y-offset value $v_y$ for the current block are refined and added to the current motion vector as a final motion vector, which is referred by a following block. According to this method, input data associated with a current block in a current picture are received at an encoder side or a video bitstream including compressed data of the current block is received at a decoder side as shown in step 410. The x-offset value $v_x$ and the y-offset value $v_y$ for the current block are derived by applying a BIO (bi-directional optical flow) process in step 420. The x-offset value $v_x$ and the y-offset value $v_y$ are added to one or more original motion vectors to generate one or more final motion vectors for the current block in step 430. The x-offset value $v_x$ and the y-offset value $v_y$ are limited to a pre-defined range or clipped within one integer pixel. The bi-directional predictors are generated based on the final motion vectors for the current block in step 440. The current block is encoded or decoded in a bi-directional mode using the bi-directional predictors in step 450. The final motion vectors for the current block are stored to be referenced by one or more following blocks in step 460. In step 470, the video bitstream including the compressed data of the current block is outputted at the encoder side or reconstructed data including a reconstructed block of the current block at the decoder side.

Figure 5:
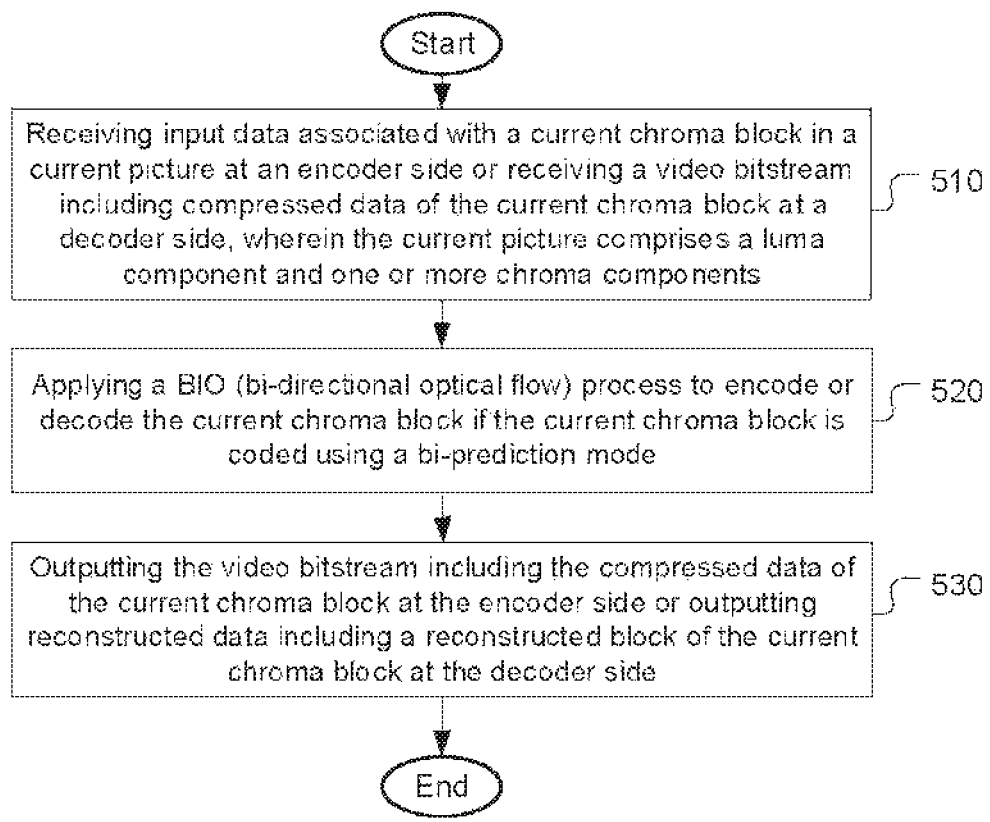
FIG. 5 illustrates an exemplary flowchart of a video coding system incorporating an embodiment of the present invention, where the BIO is applied to the chroma component.

FIG. 5 illustrates an exemplary flowchart of a video coding system incorporating an embodiment of the present invention, where the BIO is applied to the chroma component. According to this method, input data associated with a current chroma block in a current picture at an encoder side or receiving a video bitstream including compressed data of the current chroma block at a decoder side as shown in step 510. The current picture comprises a luma component and one or more chroma components. The BIO process is applied to encode or decode the current chroma block if the current chroma block is coded using a bi-prediction mode in step 520. In step 530, the video bitstream including the compressed data of the current chroma block is outputted at the encoder side or reconstructed data including a reconstructed block of the current chroma block at the decoder side.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of motion compensation for video data performed by a video encoder or a video decoder, the method comprising:

receiving input data associated with a current chroma block in a current picture at an encoder side or receiving a video bitstream including compressed data of the current chroma block at a decoder side, wherein the current picture comprises a luma component and one or more chroma components;

applying a bi-directional optical flow (BIO) process to encode or decode the current chroma block when the current chroma block is coded using a bi-prediction mode; and outputting the video bitstream including the compressed data of the current chroma block at the encoder side or outputting reconstructed data including a reconstructed block of the current chroma block at the decoder side.

2. The method of claim 1, wherein chroma x-offset value vx and chroma y-offset value vy associated with the BIO process for the current chroma block are derived only based on one or more chroma components.

3. The method of claim 1, wherein chroma x-offset value vx and chroma y-offset value vy associated with the BIO process for the current chroma block reuse luma x-offset value vx and luma y-offset value vy associated with the BIO process that are derived based on the luma component only.

4. The method of claim 3, wherein the chroma x-offset value vx and the chroma y-offset value vy are scaled based on a resolution ratio of the luma component and said one or more chroma components.

5. The method of claim 1, wherein x-offset value vx and y-offset value vy associated with the BIO process for the current chroma block are derived based on the luma component and one or more chroma components.

6. An apparatus of motion compensation for video data performed by a video encoder or a video decoder, the apparatus comprising one or more electronic circuits or processors arranged to:

receive input data associated with a current chroma block in a current picture at an encoder side or receiving a video bitstream including compressed data of the current chroma block at a decoder side, wherein the current picture comprises a luma component and one or more chroma components;

apply a bi-directional optical flow (BIO) process to encode or decode the current chroma block when the current chroma block is coded using a bi-prediction mode; and output the video bitstream including the compressed data of the current chroma block at the encoder side or output reconstructed data including a reconstructed block of the current chroma block at the decoder side.

* * * * *